UNITED STATES PATENT OFFICE.

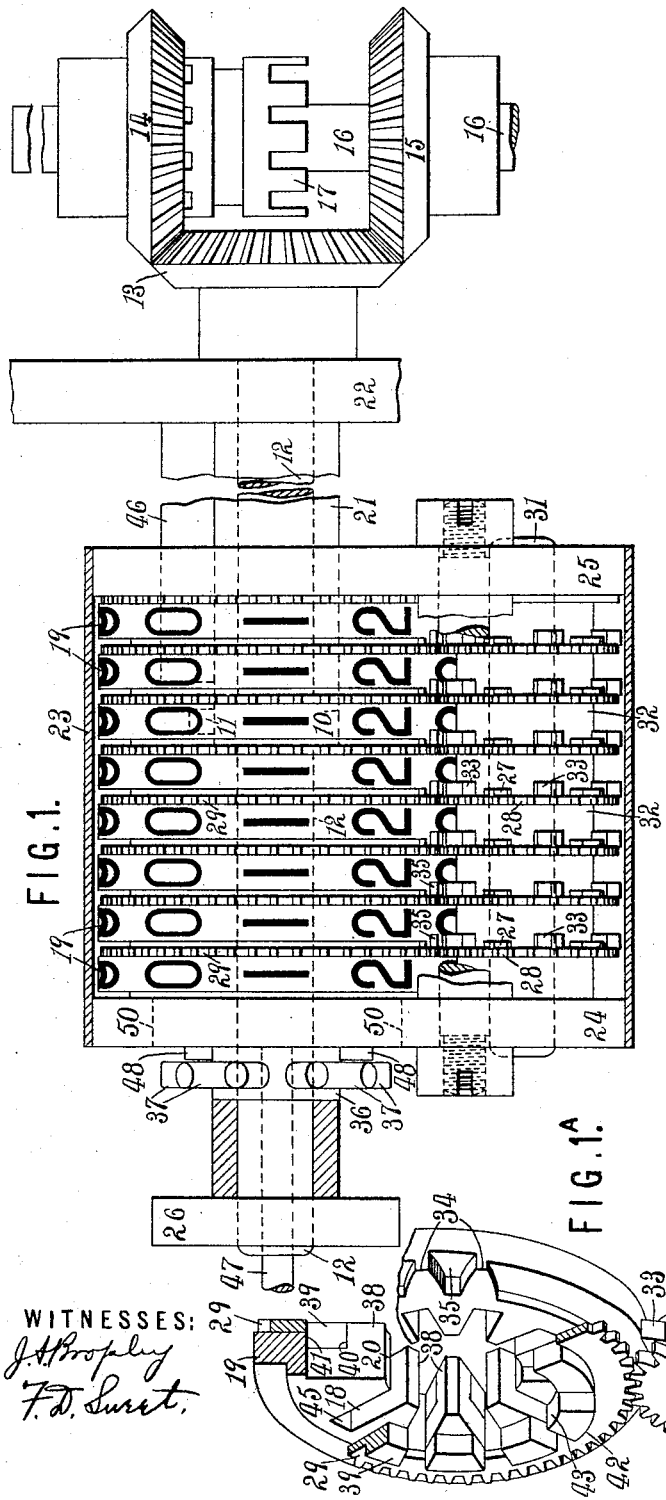

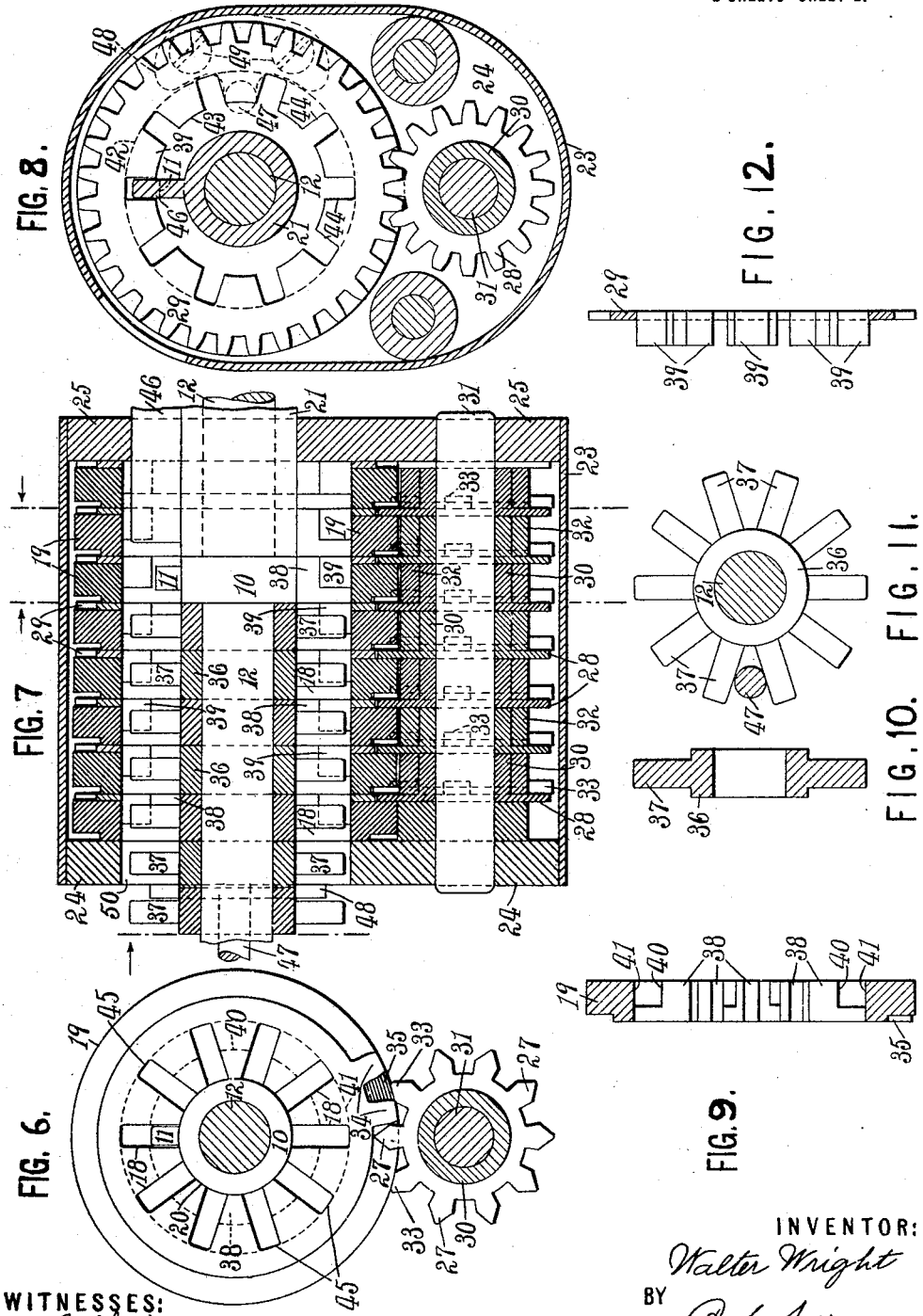

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMPUTING-MACHINE.

1,216,758.

Specification of Letters Patent.

Patented Feb. 20, 1917.

Application filed August 3, 1911. Serial No. 642,183.

*To all whom it may concern:*

Be it known that I, WALTER WRIGHT, a citizen of the United States, residing in New York city, in the county of New York and State of New York, have invented certain new and useful Improvements in Computing-Machines, of which the following is a specification.

This invention relates to computing machines, particularly those in which a master wheel is employed, either to travel along a series of computing wheels or to remain stationary while the computing wheels travel. A machine of this general character is illustrated in my Patent 1,162,730, dated November 30, 1915, and in my Patent 1,095,060, dated April 28, 1914.

One of the principal objects of the present invention is to simplify and improve the construction of the gang of computing wheels and tens-carrying devices.

According to the present improvements, each of the computing wheels of the gang is provided with a gear, whereby tens may be carried. Each gear is rotatable independently of its associated computing wheel, but coupling devices are provided for progressively or successively coupling together the computing wheels and gears in each pair. Said coupling devices are placed so that they will be effective at the left of the master wheel. The computing wheel with which the master wheel is in engagement at any time is uncoupled from its gear, so as to rotate independently thereof; but all of the computing wheels of higher denominations are coupled to their gears, and cannot rotate independently thereof. Provision is also made for locking the wheels of lower denominations against accidental rotation.

The tens-carrying devices preferably comprise Geneva-lock pinions, engaging the peripheries of the computing or dial wheels, the latter having mutilated gears for intermittently operating the Geneva-lock pinions. Fixed to each Geneva-lock pinion is a tens-carrying pinion to mesh with the computing wheel gear of next higher denomination.

In the preferred form of the invention, all of the computing wheels are locked against rotation except that wheel with which the master wheel is in engagement.

While the invention may be carried out in many forms, the preferred construction is one wherein the master wheel is arranged internally of the computing wheels and the gears; said computing wheels having internal notches to be engaged by the master wheel. Said coupling devices preferably engage the same notches in the computing wheels, and are also arranged to engage notches formed in the gears, whereby each computing wheel is coupled to its gear. These notches in the gears are not engageable by the master wheel, so that the latter can turn a gear only through the operation of the remainder of the tens-carrying mechanism. The entire device may be very compactly and inexpensively made, and is durable in construction and reliable in operation, and readily adapted to existing types of machines. Other features and advantages will hereinafter appear.

In the accompanying drawings,

Figure 1 is a front elevation partly in section, of a traveling computing head and a master wheel mechanism constructed in accordance with the present improvements.

Fig. 1ª is a perspective view of a dial wheel, a gear associated therewith, and a tens-carrying train, the latter connected to a gear of higher denomination, shown in section.

Fig. 2 is a sectional view of a Geneva-lock and tens-carrying pinion, seen at the lower part of Fig. 1ª.

Fig. 3 is an elevation of the same.

Fig. 4 is an elevation of the master wheel.

Fig. 5 is a sectional view of a tubular support provided with a locking rib, and designed to surround the master wheel shaft.

Fig. 6 is an elevation of a computing wheel and a Geneva pinion engaging the same.

Fig. 7 is a sectional elevation of a computing head or carriage showing the master wheel and the set of coupling pinions.

Fig. 8 is a sectional end elevation of the same.

Fig. 9 is a sectional view of a computing wheel.

Fig. 10 is a sectional view of a coupling pinion.

Fig. 11 is a face view of the same.

Fig. 12 is a sectional view of a gear having a radially slotted hub.

The master wheel of the computing mechanism comprises a hub 10 and preferably a single tooth 11, said hub fixed upon a shaft 12 between the ends of the latter; one end carrying a pinion 13, by which the master wheel is intermittently rotated variable distances. In one kind of machine, the pinion 13 meshes with opposite bevel pinions 14, 15, mounted loosely upon a drive shaft 16 controlled by the numeral keys; a double clutch 17 being splined to the shaft 16 and adapted to move into and out of engagement with internal clutches provided upon the pinions 14, 15, whereby the direction of rotation of the master wheel may be reversed for subtraction. The tooth 11 of the master wheel may engage any of a series of ten notches 18 formed internally in each of a gang of dial or computing wheels 19, each of which has an internal bore 20, of a size to fit loosely upon the hub 10 of the master wheel, and upon a fixed tubular support 21 projecting from a part of the framework 22 and surrounding the master wheel shaft 12. The dial wheels may therefore slide along over said hub and said tube 21; and the nest or gang of master or computing wheels, seen at Figs. 1 and 7 may be given a step-by-step movement in any suitable manner, as for instance, in connection with the letter-feeding movements of the carriage of a typewriting machine, as shown in my aforesaid patents. By this means the dial wheels are rotated one by one, as the keys of the typewriter or computing machine are operated.

Preferably, the dial wheels are confined in a carriage, comprising a casing 23 and end plates 24, 25, which may be supported and operated in any suitable manner. The invention however includes machines in which a master wheel travels step by step along the gang of computing wheels. The shaft 12 passes entirely through the carriage from end to end, and at its opposite end is supported in a portion 26 of the framework.

The tens-carrying mechanism includes a train connecting each dial wheel with the wheel of higher denomination. Each train includes a Geneva lock pinion 27 and a transfer pinion 28 fixed thereto, and meshing with a gear 29 on the dial wheel 19 of next higher denomination, or in other words, the pinion 28 meshes with a gear 29 at the left of that dial wheel 19, which is engaged by the Geneva pinion 27 which is fixed to said transfer pinion 28. The transfer pinions 28 may preferably have hubs 30, whereby they are loosely mounted upon a shaft 31 mounted at its ends in the end plates 24, 25 of the computing carriage or head; and the Geneva pinions 27 may have hubs 32 surrounding and fixed to the hubs 30, as seen at Fig. 2. Each pair of pinions at Fig. 2 forms a carry-over wheel or unit, and is revoluble independently of the other units on the shaft 31.

Every alternate tooth on the ten-tooth Geneva pinion 27 is offset preferably by thickening the same, as at 33; and by reason of being offset, two of these teeth may stand in engagement with the periphery of dial wheel 19, Fig. 7, while a thin tooth 27 between said thick teeth laps over the side of said dial wheel in position to be engaged by either of two teeth 34, forming a mutilated gear on the side of each dial wheel 19. By means of this mutilated gear the Geneva pinion is turned one-fifth of a revolution, while the dial is turning from "9" to "0," once in each revolution. Each dial wheel is provided with a cut away or recessed portion 35 between the two teeth 34 of its mutilated gear, to permit the latter to mesh with the thick or offset tooth 33 to enable the Geneva pinion to be driven by the dial wheel. At the completion of each of the intermittent operations of the Geneva pinion, the latter stands in locking relation with the dial wheel, seen at Fig. 6, and hence neither the Geneva pinion 27 nor the transfer or connecting pinion 28 can rotate. It follows that the dial wheel gear 29, with which said transfer pinion 28 is in mesh, is also prevented from rotation. In other words, each dial wheel is locked against rotation by reason of its connection with the Geneva pinion of next lower denomination.

The gear 29, associated with each of the dial wheels 19, is not permanently fixed thereto, as has heretofore been the practice, but is loosely mounted with reference thereto, to the end that there may be independent relative movement thereof at certain times, as will presently appear. Each of the dial wheels, taken with its associated gear, may be regarded as forming a pair; and each of these pairs, at the left of the master wheel 10, is temporarily coupled by a series of coupling devices; and each of these coupling devices preferably consists of a hub 36 and a series of ten long teeth or spokes 37, Fig. 11, loosely mounted upon the master wheel shaft 12. It will be seen that each dial wheel 19 has a hub 38, while each gear 29 has a hub-portion 39 which surrounds said hub 38 and is in effect journaled thereon. It will also be seen that said hub 38 is formed by recessing the dial wheel; the inner and outer walls of the recess being designated as 40 and 41. The hub 39 of the gear 29 fits loosely in said recess, and the face of said gear 29 sets up close to the side of the dial wheel as seen at Figs. 1 and 7. At Fig. 8, the outer periphery of the hub 39 is marked 42, and the inner periphery thereof is marked 43. The distance between the said outer and inner peripheries of the hub 39 is the same as that between the peripheries 41 and 40 of the hub 38, so that the hub 39 of the gear can fit loosely in the recess in the dial wheel. The hub 39 of the gear has ten notches 44, through which the teeth 37 on the couplers may freely pass; and it will also be understood that the notches 18 in the dial wheel are lengthened outwardly to points marked 45, for the purpose of permitting the passage of the teeth 37 of the couplers.

By referring to Fig. 7, it will be seen that the teeth 37 on each coupler fit not only in the notches 18 of the dial wheels 19, but also in the notches 44 of the gears 29. In other words, the teeth 37 fit into both hubs 38 and 39 simultaneously, both hubs being notched for the purpose, and the notches in one registering with those in the other. Hence the members 19 and 29 in each pair are temporarily coupled together by the coupler 36 37, and each coupler is loose upon the shaft 12 and rotatable independently of the other couplers. Hence the Geneva mechanism is effective to carry tens to the wheel or wheels of higher denominations than that upon which the master wheel 10 is acting. It may be said that the members 19 and 29 form a composite computing wheel, the parts of which are capable of relative rotation, but when connected by a coupler 36, 37, rotate as a unit.

It will further be noticed that the tooth 11 of the master wheel is too short to enter any of the notches 44 in the gear 29, and hence the master wheel, when directly turning any dial wheel, cannot turn the gear with which said dial wheel is immediately associated. In fact, the last mentioned gear remains stationary during such action of the master wheel, being held against rotation by reason of its engagement with the transfer pinion 28 and consequent connection to the Geneva wheel 27, which is locked by the dial wheel 19 of next lower denomination. While all of the dial wheels to the left of the master wheel are locked, there is nothing to prevent the master wheel from turning the dial wheel with which it directly engages, and, of course, the latter may operate the tens-carrying train, and tens may be carried upon all the wheels of higher denomination concomitantly. The wheels of lower denomination than the master wheel are locked against rotation by a locking bar or key 46 fixed upon the stationary tube 21 in position to pass through the registering notches 18 in the dial wheels and 44 in the gears. Hence all of the wheels 19 and 29 are positively locked against rotation except the particular wheel 19 which is directly in mesh with the master wheel 10, 11, while the Geneva locks are also capable of carrying the tens from said master wheel throughout the remainder of the gang or set.

A locking bar or key 47 is fixed by means of a bracket 48, Figs. 7 and 8, and screws 49, upon the end plate 24 of the computing head, and registers with the spaces between the teeth 37, Fig. 11, so as to hold against rotation those coupling devices 36, 37, which may emerge from the computing head. The left hand end plate 24 may have notches 50 of the same form as the notches 18, at Fig. 6, to hold against rotation the coupling device 36, 37, which is at any time in line with said end plate, as at Fig. 7.

Variations may be resorted to within the scope of the invention, and portions of the improvements may be used without others.

Having thus described my invention, I claim:

1. The combination of a series of computing wheels, a master wheel, provision being made for relative movement in axial direction between the master wheel and computing wheels, tens-carrying devices to engage said computing wheels, gears on the computing wheels to mesh with said tens-carrying devices, said gears and said computing wheels being relatively rotatable, and rotatable devices to couple the computing wheels to their associated gears respectively; said coupling devices being disposed to the left of said master wheel and associated therewith in respect to said relative movements in axial direction.

2. The combination of a series of computing wheels, a master wheel, provision being made for relative movement in axial direction between the master wheel and computing wheels, Geneva lock pinions to engage said computing wheels, each of the latter having a mutilated gear to coöperate with the Geneva-lock pinion, tens-carrying pinions connected to said Geneva-lock pinions, gears associated with the computing wheels to mesh with said tens-carrying pinions, said gears and said computing wheels being relatively rotatable, and means for alining each computing wheel and its associated gear below the master wheel, said alining means acting through said Geneva-lock pinions to aline the gear associated with the computing wheel in engagement with the master wheel.

3. The combination of a series of computing wheels, a master wheel, provision being made for relative movement in axial direction between the master wheel and computing wheels, pinions to engage said computing wheels, each of the latter having means to coöperate with the pinion, tens-carrying pinions connected to said pinions, gears associated with the computing wheels to mesh with said tens-carrying pinions, said gears and said computing wheels being relatively rotatable, and rotatable devices to couple the computing wheels to their associated gears respectively.

4. The combination of a series of computing wheels having internal teeth or notches, an internal master wheel to engage said teeth or notches, provision being made for relative movement in axial direction between the master wheel and the computing wheels, tens-carrying devices to engage said computing wheels, gears associated with the computing wheels to mesh with said tens-carrying devices, said gears having internal teeth or notches registering with those on said computing wheels, said gears and said computing wheels being relatively rotatable, and rotatable internal devices to engage said teeth or notches, to couple the computing wheels to their associated gears respectively.

5. The combination of a series of computing wheels having internal teeth or notches, gears one associated with each computing wheel, said gears having internal teeth or notches registering with those of said computing wheels, an internal master wheel to engage the teeth or notches in said computing wheels only to thereby rotate said computing wheels relatively to said gears, provision being made for relative movement in axial direction between the master wheel and the computing wheels, tens carrying devices inclusive of Geneva-lock pinions to engage said computing wheels and be locked thereby and coöperate with the gears associated therewith, and means to aline computing wheels and gears of lower orders than the gear and wheel engaged by the master wheel, said alining means acting through the medium of said Geneva-lock pinions to aline the gear associated with the computing wheel engaged at the time by the master wheel.

6. The combination of a series of computing wheels having internal teeth or notches, gears associated with the computing wheels, said gears having internal teeth or notches to register with those on said computing wheels, a master wheel to engage the teeth or notches in said computing wheels only, provision being made for relative movement in axial direction between the master wheel and the computing wheels, said gears and said computing wheels being relatively rotatable, and rotatable devices to engage the teeth or notches on both the computing wheels and gears, to couple the computing wheels to their associated gears respectively.

7. The combination of a series of computing wheels having internal teeth or notches and also having mutilated gears, gears associated with the computing wheels, said last-mentioned gears having internal teeth or notches to register with those on said computing wheels, an internal master wheel to engage the teeth or notches of said computing wheels only, provision being made for relative movement in axial direction between the master wheel and the computing wheels, Geneva-lock pinions to engage external peripheries on said computing wheels and to coöperate with said mutilated gears, each Geneva-lock pinion being fixed to a tens-carrying pinion, said gears and said computing wheels being relatively rotatable, but a gear being normally locked by its engagement with a tens-carrying pinion, and rotatable internal devices to engage the teeth or notches on both the computing wheels and gears, to couple the computing wheels to their associated gears respectively at all orders higher than that engaged by the master wheel to enable a carrying operation through the train of wheels.

8. The combination of a gang of computing wheels having internal teeth or notches, a series of loose gears having internal teeth or notches, an internal master wheel having one or more teeth to engage the notches in the computing wheels, but incapable of engaging the notches in the gears, coupling devices, each independently rotatable and each having one or more teeth to simultaneously engage the notches in both a computing wheel and a gear to couple them together, provision being made for relative movement in axial direction between the gang of computing wheels and both the master wheel and coupling devices, and tens-carrying devices to coöperate with said computing wheels and said gears.

9. The combination of a gang of computing wheels having hubs, a series of gears having hubs fitting or nested loosely upon the computing-wheel hubs to permit independent rotation of each gear, all of said hubs having registering internal teeth or notches, an internal master-wheel having one or more teeth to engage the notches in the computing wheel hubs, but too short to engage the notches in the gear hubs, coupling devices, each independently rotatable and each having one or more teeth to simultaneously engage the notches in the nested hubs, to couple a gear to a computing wheel, provision being made for relative movement in axial direction between the gang of computing wheels and both the master-wheel and the coupling devices, and tens-carrying devices to coöperate with said computing wheels and said gears.

10. In a computing machine, the combination with a series of computing wheels and carry-over mechanism therefor, of a master wheel for turning said wheels *seriatim*, a gear on a computing wheel for turning it by said master wheel, a loose gear concentric with each computing wheel arranged to be engaged by a carry-over mechanism, and means for causing said wheel and said loose gear to revolve as a unit.

11. In a computing machine, the combination with a series of computing wheels and carry-over wheels associated with them, of a master wheel for turning said wheels *seriatim*, a gear on a computing wheel for turning it, a loose gear concentric with said computing wheel arranged to be engaged by a carry-over wheel embodying a Geneva lock, a periphery on a computing wheel arranged to lock said carry-over wheel and thereby said loose gear through said Geneva lock, and means for causing said wheel and loose gear to revolve as a unit.

12. In a computing machine, the combination with a series of computing wheels, of a master wheel for turning said wheels *seriatim*, two concentric separately-revoluble gears forming part of each computing wheel, a carry-over wheel for each computing wheel adapted to be engaged by one of said gears thereof, a tooth forming part of one of the gears of each computing wheel adapted to turn the carry-over wheel for the adjacent computing wheel and means forming part of each computing wheel holding said carry-over wheel normally locked and thereby one of said gears.

13. In a computing machine, the combination with a series of computing wheels, of a master wheel traveling relatively thereto, a series of loose gears, one for each computing wheel lying against its associated computing wheel, a series of couplers fixed in relation to said master wheel, and arranged to lock the computing wheels and loose gears above the master wheel and to unlock each computing wheel and its associated gear engaged by the master wheel during relative travel of the computing wheels and master wheel, carry-over pinions engaging said loose gears, and a Geneva lock rigid with each carry-over pinion to hold said loose gears from movement during a drive of a computing wheel by the master wheel, but permitting turning of the gear and its associated computing wheel while coupled for carrying.

14. In a computing machine, the combination with a gang of computing wheels comprising teeth, of carry-over members, gears comprising teeth alineable with said computing wheel teeth, said gears concentric with said computing wheels for connecting them to said carry-over members, a master wheel arranged to engage the teeth of the computing wheels only *seriatim*, and couplers for said gears and wheels arranged to engage them both by said alineable teeth *seriatim* so as to always engage the wheels higher in denomination than the master wheel.

15. The combination with computing wheels, and internal teeth on said wheels, of a master wheel arranged to engage said teeth *seriatim*, a sleeve on the shaft of said master wheel, and a locking bar fast on said sleeve arranged to lock all computing wheels against rotation.

16. The combination with a set of composite computing wheels arranged together in a group to form a computing head, each of said composite computing wheels comprising a plurality of relatively-movable parts, and coupling means for joining the parts of said composite computing wheels individually, so as to enable the parts of each computing wheel to rotate together as a unit.

17. In a computing machine, the combination with a series of computing wheels, of gear wheels co-axial therewith, one gear wheel for each dial wheel of higher order than units, a master wheel for turning said computing wheels *seriatim* relatively to said gear wheels, carry-over device between the computing wheels to engage the gear associated with the computing wheel of next higher order, a tooth forming part of each computing wheel to turn the carry-over device for that wheel, means forming part of each computing wheel holding said carry-over wheel normally locked and thereby the gear associated with the computing wheel of next higher order and means for coupling the gear and its associated computing wheel for each of the higher orders for carrying.

18. In a computing machine, the combination with a master wheel, of a set of computing wheels comprising a set of gears adapted to be turned by the master wheel, carry-over wheels, other gears forming parts of said computing wheels adapted to be separately turned by the carry-over wheels, and means for selectively coupling the gears of each wheel to enable computations to be effected.

19. In a computing machine, the combination with computing wheels, of a gear associated with each computing wheel devoted exclusively to the carry-over operation, carry-over wheels for effecting such carry-over operation, a second gear forming part of each computing wheel and entirely disconnected from said first-named gear, a master wheel for engaging said separate gears *seriatim*, and coupling means for each computing wheel for determining whether the master wheel or the carry-over wheel may be effective to directly turn any given computing wheel.

20. The combination with a set of split number wheels, each consisting of two parts relatively movable, of a master wheel, and means for locking together the parts of all of the number wheels of higher denomination than that being operated by the master wheel so that any of said wheels that turn, turn as if integral.

21. In a totalizer, the combination with a series of dial wheels, of gear wheels co-axial therewith, one gear wheel for each dial wheel of higher order than units, means to enable any dial wheel to turn independently of its associated gear wheel during a primary valuating operation, and means for automatically causing a dial wheel of lower order to carry to a dial wheel of higher order through the medium of the gear wheel associated with the dial wheel of higher order.

22. In a totalizer, the combination with a series of dial wheels, of gear wheels associated therewith, transfer elements between the dial wheels of different orders, a dial wheel of lower order and a gear wheel associated with the dial wheel of next higher order both engaging the same transfer element, means enabling any dial wheel to turn independently of its associated gear wheel during a valuating operation, and means for causing a dial wheel of lower order to carry to a dial wheel of higher order through the medium of the transfer element and the gear wheel associated with the dial wheel of higher order.

23. In a totalizer, the combination with a series of dial wheels, of gear wheels co-axial therewith, a shaft, a master member carried by said shaft for engaging said dial wheels *seriatim*, and coupling means also carried by said shaft for coupling the dial and gear wheels of higher orders to effect carrying.

WALTER WRIGHT.

Witnesses:
PAUL ZIRON,
K. FRANKFORD.

Copies of this patent may be obtained for five cents each, by addressing the "Commissioner of Patents, Washington, D. C."